United States Patent
Kellner et al.

(10) Patent No.: US 10,034,119 B2
(45) Date of Patent: Jul. 24, 2018

(54) SYSTEM AND METHOD FOR TESTING COMMUNICATION IN A VEHICLE SYSTEM

(71) Applicant: General Electric Company, Schenectady, NY (US)

(72) Inventors: Steven Andrew Kellner, Melbourne, FL (US); Robert James Foy, Melbourne, FL (US); Robert Carmen Palanti, Melbourne, FL (US); Brian William Schroeck, Melbourne, FL (US); Paul Aaron Connolly, Erie, PA (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 14/537,346

(22) Filed: Nov. 10, 2014

(65) Prior Publication Data
US 2016/0134994 A1    May 12, 2016

(51) Int. Cl.
| | |
|---|---|
| *H04W 4/70* | (2018.01) |
| *H04W 4/00* | (2018.01) |
| *H04L 29/08* | (2006.01) |
| *H04B 1/40* | (2015.01) |
| *H04L 29/14* | (2006.01) |

(52) U.S. Cl.
CPC ............. *H04W 4/005* (2013.01); *H04B 1/40* (2013.01); *H04L 67/025* (2013.01); *H04L 67/12* (2013.01); *H04L 69/40* (2013.01); *H04W 4/70* (2018.02)

(58) Field of Classification Search
CPC .......... H04W 4/005; H04W 4/70; H04B 1/40; H04B 1/02; H04L 67/025; H04L 67/12; H04L 69/40; H04L 29/08; B61L 3/12; B61L 3/127; B61L 3/006; B61L 25/025; B61L 2205/04; B61C 17/12
See application file for complete search history.

(56) References Cited

U.S. PATENT DOCUMENTS

| | | | |
|---|---|---|---|
| 6,041,216 A | 3/2000 | Rose et al. | |
| 6,135,396 A | 10/2000 | Whitfield et al. | |
| 6,216,095 B1 | 4/2001 | Glista | |
| 6,997,418 B1 | 2/2006 | Sanzone | |
| 7,529,201 B2 | 5/2009 | Aiken, II et al. | |
| 7,535,865 B2 | 5/2009 | Aiken, II et al. | |

(Continued)

FOREIGN PATENT DOCUMENTS

| | | | | |
|---|---|---|---|---|
| WO | WO 2009120521 A1 | * | 10/2009 | ............. B61C 17/12 |

*Primary Examiner* — Kwang B Yao
*Assistant Examiner* — Hardikkumar Patel
(74) *Attorney, Agent, or Firm* — GE Global Patent Operation; John A. Kramer (57) ABSTRACT

Communication methods and systems wirelessly communicate onboard messages between communication devices onboard the same vehicle. The communication devices can wirelessly communicate with other communication devices onboard other vehicles in a vehicle system for remote control of the vehicles. Receipt of the onboard messages at the communication devices is determined, and operative states of the communication devices are determined based at least in part on the receipt of the onboard messages at the communication devices. Determining these operative states in this manner can allow for an operator to identify communication faults with the communication devices prior to departing the vehicle.

19 Claims, 5 Drawing Sheets

(56) References Cited

U.S. PATENT DOCUMENTS

| | | |
|---|---|---|
| 7,792,089 B2 | 9/2010 | Aiken, II et al. |
| 8,239,078 B2 * | 8/2012 | Siddappa ................ B61C 17/12 |
| | | 455/92 |
| 8,280,566 B2 | 10/2012 | Foy, III et al. |
| 8,364,338 B2 | 1/2013 | Peltonen et al. |
| 8,532,850 B2 | 9/2013 | Cooper et al. |
| 8,537,061 B2 | 9/2013 | Corwin et al. |
| 8,583,299 B2 | 11/2013 | Goodermuth et al. |
| 8,696,071 B2 | 4/2014 | Root et al. |
| 8,714,494 B2 | 5/2014 | Weber |
| 8,798,821 B2 | 8/2014 | Kraeling et al. |
| 2002/0059018 A1 * | 5/2002 | Brousseau .............. B61L 3/127 |
| | | 701/19 |
| 2016/0134994 A1 * | 5/2016 | Kellner ................ H04W 4/005 |
| | | 370/329 |

\* cited by examiner

SYSTEM AND METHOD FOR TESTING COMMUNICATION IN A VEHICLE SYSTEM

FIELD

Embodiments of the inventive subject matter described herein relate to communications between vehicles in a vehicle system.

BACKGROUND

Some known vehicle systems include several vehicles that generate tractive effort for propelling the vehicle systems along a route. For example, trains may have several locomotives coupled with each other that propel the train along a track. The locomotives may communicate with each other in order to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the vehicle system.

Some known vehicle systems use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands. The remote locomotives can communicate responsive messages to the lead locomotive to notify the lead locomotive that the remote locomotive received the command and/or to report the current status of the remote locomotive.

Prior to a trip, an operator may go onboard each locomotive and set up the remote locomotives for being remotely controlled by the lead locomotive. The operator may then go onboard the lead locomotive to link the lead locomotive with the remote locomotives. If the wireless devices onboard one or more of the remote locomotives are not working, are not turned on (e.g., due to a circuit breaker being in an off position), or are otherwise unable to communicate with the lead locomotive, then the operator may need to travel back onto the remote locomotive or locomotives to diagnose and fix any problems.

For example, a common complaint is the inability to link a lead locomotive to remote locomotives due to a failure of a radio system on either the lead or the remote locomotive (transmitter, receiver, antenna, cables, etc.), or simply because a circuit breaker for the radio system is in the off or open position. In such a situation, an operator may set up the remote locomotives and then travel to the lead locomotive to set up the lead locomotive for DP operations. The operator may then attempt to link to the remote locomotives to the lead locomotive. If the radio circuit breaker was turned off on the remote locomotive or there was some kind of hardware failure, the operator may need to travel back to the remote locomotive and diagnose the issue. Given the length of some trains, this can result in considerable time and effort before the train is ready for departure.

BRIEF DESCRIPTION

In one embodiment, a method (e.g., for testing communication in a vehicle system) includes wirelessly communicating a first onboard message from a first communication device onboard a first vehicle to a second communication device that also is onboard the first vehicle. The first communication device and the second communication device are configured to wirelessly communicate with one or more other communication devices disposed onboard one or more second vehicles in a vehicle system that includes the first vehicle and the one or more second vehicles for remote control of at least one of the first vehicle or the one or more second vehicles. The method also can include determining receipt of the first onboard message at the second communication device, wirelessly communicating a second onboard message from the second communication device to the first communication device, determining receipt of the second onboard message at the first communication device, and determining a first operative state of the first communication device and a second operative state of the second communication device of the first vehicle based at least in part on the receipt of the first onboard message at the second communication device and the receipt of the second onboard message at the first communication device.

In another embodiment, a system (e.g., a communication system of a vehicle system) includes first and second communication devices, and one or more processors. The first communication device is configured to be disposed onboard a first vehicle in a vehicle system that also includes one or more second vehicles. The second communication device is configured to also be disposed onboard the first vehicle. The one or more processors are configured to be disposed onboard the first vehicle. The first communication device and the second communication device are configured to wirelessly communicate with one or more other communication devices disposed onboard the one or more second vehicles for remote control of at least one of the first vehicle or the one or more second vehicles. The first communication device is configured to wirelessly communicate a first onboard message to the second communication device and the second communication device is configured to wirelessly communicate a second onboard message from the second communication device to the first communication device. The one or more processors are configured to determine receipt of the first onboard message at the second communication device and receipt of the second onboard message at the first communication device. The one or more processors also are configured to determine a first operative state of the first communication device and a second operative state of the second communication device of the first vehicle based at least in part on the receipt of the first onboard message at the second communication device and the receipt of the second onboard message at the first communication device.

In another embodiment, another system (e.g., another communication system) includes first and second transceiver devices, and one or more processors. The first transceiver device can be configured to be disposed onboard a first vehicle in a vehicle system that also includes one or more second vehicles. The first transceiver device includes a first transmitter and a first receiver. The second transceiver device can be configured to also be disposed onboard the first vehicle. The second transceiver device includes a second transmitter and a second receiver. The first transmitter is configured to wirelessly transmit a first onboard message to the second receiver and the second transmitter is configured to wirelessly transmit a second onboard message to the first receiver. The one or more processors can be configured to be disposed onboard the first vehicle and to determine operative states of the first transceiver device and the second transceiver device based on receipt of the first onboard message at the second receiver and receipt of the second onboard message at the first receiver. Responsive to determining that the first onboard message and the second onboard message were received, the one or more processors are configured to communicatively link one or more of the first transceiver device or the second transceiver device with one or more third transceiver devices disposed onboard the one or more second vehicles.

In another embodiment, a system (e.g., another communication system) includes one or more processors configured to be disposed onboard a first vehicle in a vehicle system that also includes one or more second vehicles. The one or more processors are further configured to determine receipt of a first onboard message from a first communication device onboard the first vehicle at a second communication device onboard the first vehicle and receipt of a second onboard message from the second communication device at the first communication device. The first communication device and the second communication device can be configured to wirelessly communicate with one or more other communication devices disposed onboard the one or more second vehicles for remote control of at least one of the first vehicle or the one or more second vehicles. The one or more processors can be configured to determine a first operative state of the first communication device and a second operative state of the second communication device of the first vehicle based at least in part on the receipt of the first onboard message at the second communication device and the receipt of the second onboard message at the first communication device.

BRIEF DESCRIPTION OF THE DRAWINGS

Reference is now made briefly to the accompanying drawings, in which.

DETAILED DESCRIPTION

One or more embodiments of the inventive subject matter described herein provide systems and methods for testing wireless communication devices onboard vehicles of a vehicle system. While the description herein focuses on rail vehicle systems having two or more locomotives, not all embodiments are limited to rail vehicles or locomotives. For example, vehicle systems formed from other types of vehicles, such as automobiles, marine vessels, mining vehicles, other off-highway vehicles (e.g., vehicles that are not designed or legally permitted to travel on public roadways), or the like, may be used. The vehicles in the vehicle system may be mechanically coupled with each other with at least one vehicle (e.g., a lead vehicle) remotely controlling operations of the other vehicles (e.g., remote vehicles). Optionally, the vehicles may not be mechanically coupled. For example, a lead vehicle may wirelessly communicate with the remote vehicles to coordinate movements of the vehicles with each other, without any mechanical coupling between the vehicles.

For vehicle systems that rely on wireless communication for command messages (that remotely control operations of other vehicles) and status messages (that report the statuses of remote vehicles) to be exchanged between lead and remote vehicles, backup communication devices (e.g., transceivers or other types of devices) may be used to increase the reliability of communication. With redundant or backup communication devices on the vehicles, frequency and/or spatial diversity can be used to ensure that at least one of the communication devices is working properly onboard each vehicle.

In one embodiment, during a set up process to communicatively link the vehicles in a distributed power (DP) arrangement where a lead vehicle remotely controls operations of one or more remote vehicles, a communication system could run a test, either automatically or manually initiated, in which a first transmitter of a first transceiver onboard a vehicle sends a radio message that is received by a second receiver of a second transceiver that is onboard the same vehicle. A second transmitter of the second transceiver can send another radio message that is received by a first receiver of the first transceiver. Both messages can be checked for accuracy by one or more processors. The success or failure of these messages to be properly transmitted and received can be communicated to an operator and/or logged. Receipt of these messages by the transceivers can indicate that the transceivers are in good, working order.

In one aspect, after the vehicle system is set up in a DP arrangement, that remote vehicles can send messages from transmitters of the remote vehicles to another transceiver, such as a receiver onboard the lead vehicle. The transceiver onboard the lead locomotive can receive the message and respond with a message that is received by receivers of the remote vehicles. This test could then be repeated with other transceivers of the remote and lead vehicles. Optionally, the transceivers onboard the vehicle system can communicate the messages with one or more off-board transceivers to test operation of the transceivers, such as with tower systems, wayside repeaters, or the like. Receipt of these messages by the transceivers can indicate that the transceivers are in good, working order.

Communicating these messages, or test messages, and confirming receipt can allow operators to ensure that the communication systems on remote vehicles are working properly and can communicate with the lead vehicle before the operators travel to the lead vehicle, thereby saving significant time and energy.

Figure 1:
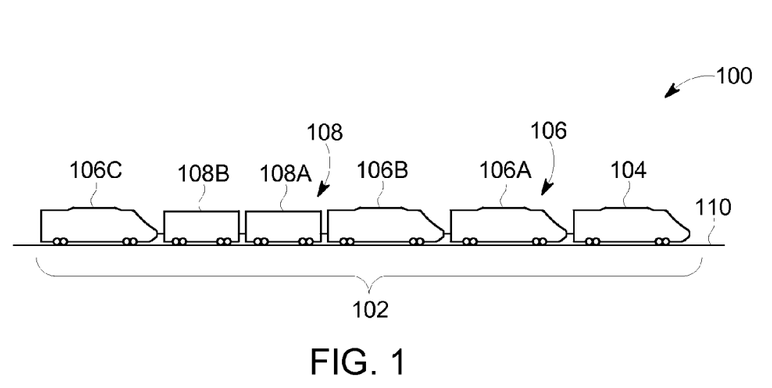
FIG. 1 is a schematic view of one embodiment of a communication system of a vehicle system.

FIG. 1 is a schematic view of one embodiment of a communication system 100 of a vehicle system 102. The illustrated vehicle system 102 includes propulsion-generating vehicles 104, 106 (e.g., vehicles 104, 106A, 106B, 106C) and non-propulsion-generating vehicles 108 (e.g., vehicles 108A, 108B) mechanically coupled with each other. The propulsion-generating vehicles are capable of self-propulsion while the non-propulsion-generating vehicles are not capable of self-propulsion. The propulsion-generating vehicles 104, 106 are shown as locomotives, the non-propulsion-generating vehicles 108 are shown as rail cars, and the vehicle system 102 is shown as a train in the illustrated embodiment. Alternatively, the vehicles 104, 106 may represent other vehicles, such as automobiles, marine vessels, or the like, and the vehicle system 102 can represent a grouping or coupling of these other vehicles. In one embodiment, the vehicles 104, 106 may not be mechanically coupled with each other. For example, the vehicles 104, 106 may be separate from each other, but may communicate with each other to coordinate operations of the vehicles 104, 106. For example, the vehicle 104 may wirelessly communicate operational command messages to the vehicles 106 that remotely control or direct operational settings of the vehicles 106 so that the vehicles 104, 106 can remain designated distances from each other or otherwise travel together. The number and arrangement of the vehicles 104, 106 in the vehicle system 102 are provided as one example and are not intended as limitations on all embodiments of the inventive subject matter described herein.

The vehicles 104, 106 can be arranged in a distributed power (DP) arrangement. For example, the vehicles 104, 106 can include a lead vehicle 104 that issues command messages to the other vehicles 106A, 106B, and/or 106C which are referred to herein as remote vehicles. The designations "lead" and "remote" are not intended to denote spatial locations of the vehicles 104, 106 in the vehicle system 102, but instead are used to indicate which vehicle 104, 106 is communicating (e.g., transmitting, broadcasting, or a combination of transmitting and broadcasting) command messages and which vehicles 104, 106 are being remotely controlled using the command messages. For example, the lead vehicle 104 may or may not be disposed at the front end of the vehicle system 102 (e.g., along a direction of travel of the vehicle system 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or vehicles 108. In one aspect, the lead vehicle 104 may wirelessly send command messages to one remote vehicle 106 in a consist, with the command messages for other remote vehicles 106 in the same consist being communicated in another manner. A consist can include two or more vehicles 104, 106 directly coupled with each other. For example, the remote vehicles 106A, 106B may be in a consist with the lead vehicle 104. The command messages communicated from the lead vehicle 104 to the remote vehicle 106A can be communicated with the other remote vehicle 106B via a wired connection (e.g., over a multiple unit cable or other cable) and/or a wireless connection.

The command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 104 issues the command messages to coordinate the tractive efforts and/or braking efforts provided by the vehicles 104, 106 in order to propel the vehicle system 102 along a route 110, such as a track, road, waterway, or the like. The remote vehicles 106 can respond to the lead vehicle 104 with reply or status messages that confirm receipt of the command messages and/or report a current operational state or status of the remote vehicles 106.

The communication system 100 can include several communication devices (described below) disposed onboard the vehicles 104, 106. These communication devices can communicate messages, such as test messages, with themselves and/or each other in order to test operation of the communication devices and determine operative states of the communication devices.

Figure 2:
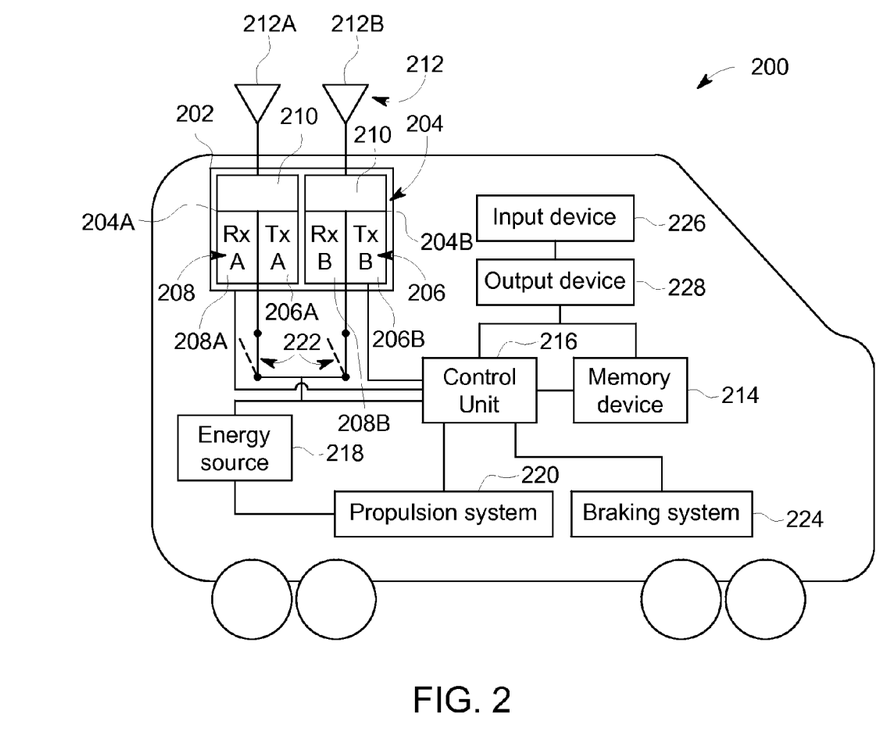
FIG. 2 is a schematic diagram of a propulsion-generating vehicle in accordance with one embodiment.

FIG. 2 is a schematic diagram of a propulsion-generating vehicle 200 in accordance with one embodiment. The vehicle 200 may represent one or more of the vehicles 104, 106 shown in FIG. 1. The vehicle 200 includes a communication assembly 202 having plural communication devices 204 (e.g., devices 204A, 204B). The communication devices 204 can represent wireless transceivers, such as radio transceivers, or other devices capable of wirelessly transmitting, broadcasting, and/or receiving messages. The communication devices 204 may be disposed within a common (e.g., the same) housing, but can be separate devices 204 each capable of separately communicating with another wireless device. For example, each communication device 204 can include a transmitter 206 (e.g., "TxA 206A" and "TxB 206B" in FIG. 2), a receiver 208 (e.g., "RxA 208A" and "RxB 208B" in FIG. 2), associated transceiving circuitry (which may include or represent one or more processors, filters, amplifiers, or the like) 210, and an antenna 212 (e.g., antennas 212A, 212B in FIG. 2) for wirelessly communicating with another device 204. While the communication devices 204 may be disposed inside the same housing, the antennas 212 of the communication devices 204 may be separate and spaced apart from each other. While the term "transmitter" is used to describe one component of the communication device 204, the transmitter 206 may not be limited to only transmitting messages to other devices 204. Instead, the transmitters 206 optionally may broadcast messages to other devices 204.

At least one of the communication devices 204 may be used during movement of the vehicle system 102 (shown in FIG. 1) to send and/or receive command messages and/or status messages. If the communication assembly 202 is disposed onboard the lead vehicle 104, then the communication device 204A may be used to wirelessly communicate command messages to the communication assemblies 202 of one or more remote vehicles 106 and/or to wirelessly receive status messages from the communication assemblies 202 of the one or more remote vehicles 106. If the communication assembly 202 is disposed onboard a remote vehicle 106, then the communication device 204A may be used to wirelessly receive command messages from the communication assembly 202 of the lead vehicle 104 and/or to wirelessly communicate status messages to the communication assembly 202 of the lead vehicle 104. The other communication device 204B may be a backup or redundant communication device 204 that is used as a replacement for the communication device 204A if the communication device 204A is unable to communicate.

In one embodiment, the communication devices 204 disposed onboard the same vehicle 200 can wirelessly communicate with each other via the antennas 212 to determine the operative states of the communication devices 204. For example, the transmitter 206A of the communication device 204A can wirelessly communicate an onboard message via the antenna 212A to the receiver 208B of the other communication device 204B via the antenna 212B. This onboard message may not be communicated to any devices located off-board the vehicle 200 in one embodiment. Alternatively, this onboard message may be received by one or more devices disposed off-board the vehicle 200. The onboard message may optionally be referred to as a test message.

The onboard message can include data, such as identifying data that indicates which communication device 204 sent the message, that indicates that the message is used for testing functionality of a communication device 204, or the like. The receiver 208B and/or the transceiving circuitry 210 of the communication device 204B can examine the content of the received onboard message to determine if the data included in the onboard message corresponds (e.g., matches) to designated data. For example, a designated pattern or other identifying data can be stored in an onboard memory device 214, such as one or more random access memories, read-only memories, hard drives, compact disk (CD) drives, digital versatile disk (DVD) drives, floppy disk drives, magnetic tapes, or other memory components. The receiver 208B and/or transceiving circuitry 210 of the communication device 204B can examine the identifying data in the received onboard message and compare the data to the stored data. If the received identifying data matches or otherwise corresponds to the stored data, then the receiver 208B and/or transceiving circuitry 210 of the communication device 204B can determine that the onboard message was successfully received by the communication device 204B from the other communication device 204A. On the other hand, if the received identifying data does not match or otherwise correspond to the stored data, then the receiver 208B and/or transceiving circuitry 210 of the communication device 204B may not determine that the onboard message was successfully received by the communication device 204B from the other communication device 204A.

Prior to, subsequent to, or during the same time that the transmitter 206A of the communication device 204A sends the onboard message to the receiver 208B of the communication device 204B, the transmitter 206B of the communication device 204B can wirelessly communicate another onboard message via the antenna 212B to the receiver 208A of the communication device 204A via the antenna 212A. This onboard message may not be communicated to any devices located off-board the vehicle 200 in one embodiment. Alternatively, this onboard message may be received by one or more devices disposed off-board the vehicle 200. The onboard message may optionally be referred to as a test message.

This onboard message may be similar or identical to the onboard message sent from the transmitter 206A of the communication device 204A to the receiver 208B of the communication device 204B. Alternatively, the onboard messages may differ from each other. The receiver 208A and/or transceiving circuitry 210 of the communication device 204A can examine the identifying data in the received onboard message and compare the data to the stored data. Similar to as described above, if the received identifying data matches or otherwise corresponds to the stored data, then the receiver 208A and/or transceiving circuitry 210 of the communication device 204A can determine that the onboard message was successfully received by the communication device 204A from the other communication device 204B. On the other hand, if the received identifying data does not match or otherwise correspond to the stored data, then the receiver 208A and/or transceiving circuitry 210 of the communication device 204A may not determine that the onboard message was successfully received by the communication device 204A from the other communication device 204B.

The communication devices 204A, 204B can report the successful and/or unsuccessful communication of the onboard messages to a control unit 216 of the vehicle 200. The control unit 216 represents hardware circuits or circuitry that include and/or are connected with one or more processors, such as one or more microprocessors, controllers, or the like, to perform operations described herein. The communication devices 204A, 204B can communicate confirmation messages to the control unit 216 to indicate successful or unsuccessful receipt of the onboard messages. The control unit 216 can determine the receipt of the onboard messages by the communication device 204A and/or the communication device 204B based on these confirmation messages.

The control unit 216 determines operative states of the communication devices 204A, 204B of the vehicle 200 based at least in part on whether the communication devices 204A, 204B received the onboard messages. If neither communication device 204A, 204B received the onboard message, then the control unit 216 can determine that the communication assembly 202 is not operational and is not able to wirelessly communicate. If one of the communication devices 204A or 204B received the onboard message, but the other communication device 204B or 204A did not, then the control unit 216 can determine that the corresponding communication device 204A or 204B that did not receive the onboard message is not operational and cannot wirelessly communicate while the other communication device 204A or 204B is operational and able to wirelessly communicate. If both of the communication devices 204A, 204B received the onboard message sent to the corresponding communication device 204A, 204B, then the control unit 216 can determine that the communication assembly 202 is operational.

Optionally, the communication assembly 202 may include more than two communication devices 204. The communication devices 204 can send two or more onboard messages between different combinations of the communication devices 204 to determine operational states of the communication devices 204 as described above. Based on the successful or unsuccessful receipt of the messages, the control unit 216 can determine which communication devices 204 are operational and which are not operational as the operational states of the communication devices 204.

The operational states of the communication devices 204 can depend on a variety of factors. For example, advancing age, wear and tear, damage, or the like, can cause a communication device 204 to fail and no longer be able to wirelessly communicate. This can be referred to as a communication fault. In one embodiment, a communication fault may occur and the communication devices 204 may be unable to wirelessly communicate responsive to power being cut off from the communication devices 204. The communication devices 204 can be powered by electric current supplied from an onboard energy source 218, such as a generator, alternator, battery, flywheel, capacitor, or the like. This energy source 218 may be powered by a propulsion system 220 of the vehicle 200. The propulsion system 220 can represent one or more engines, motors (e.g., traction motors), or the like, that generate tractive effort to propel the vehicle 200. The energy source 218 can include a generator, alternator, or the like, that generates electric current from a shaft that is rotated by an engine of the propulsion system 220. Optionally, the energy source 218 can include a battery, catenary, or the like, that supplies current. The energy source 218 can generate or obtain current to power several components of the vehicle 200, including the communication devices 204. Switches 222 (e.g., circuit breakers or the like) may be disposed between the communication devices 204 and the energy source 218 to protect the communication devices 204 (e.g., from power surges). The switches 222 may open to prevent current from being conducted to a corresponding communication device 204 and may close to conduct current to the corresponding communication device 204. If a switch 222 is opened without an operator being aware, then the operator may not be aware that the corresponding communication device 204 is unable to communicate. By communicating the onboard messages between the communication devices 204 of the same communication assembly 202 while the operator is onboard the vehicle 200, the operator may quickly determine if an open switch 222 is causing a communication fault for one or more of the communication devices 204. Otherwise, the operator may be unaware of the open switch 222 until the operator leaves the vehicle 200 (e.g. and travels back to the lead vehicle 104).

The control unit 216 is connected with an input device 226 and an output device 228. The control unit 216 can receive manual input from an operator of the vehicle 200 through the input device 226, such as a touchscreen, keyboard, electronic mouse, microphone, or the like. For example, the control unit 216 can receive instructions to initiate communication of one or more wireless messages (e.g., onboard and/or off-board messages), manually input changes to the tractive effort, braking effort, speed, power output, and the like, from the input device 226. The control unit 216 can present information to the operator using the output device 228, which can represent a display screen (e.g., touchscreen or other screen), speakers, printer, or the like. This information can include information communicated from another vehicle to the vehicle 200, indications of which communication devices 204 are operational or non-operational, recommended remedial actions for fixing or inspecting non-operational communication devices 204, or the like.

The control unit 216 can communicatively link the vehicle 200 with one or more other vehicles 104, 106 in the vehicle system 102 based at least in part on the operational state of the communication devices 204 of the vehicle 200. For example, in one embodiment, responsive to determining that at least one of the communication devices 204 is operational (e.g., is able to wirelessly transmit and/or broadcast messages to another vehicle 104, 106 and/or is able to wirelessly receive messages from another vehicle 104, 106), the control unit 216 may communicatively link the communication assembly 202 of the vehicle 200 with one or more other vehicles 104, 106 in the same vehicle system 102. Communicatively linking the vehicles may involve the communication assembly 202 of a first vehicle sending a link message to the communication assembly 202 of a second vehicle. The second vehicle may receive the link message and respond with a reply message that is sent from the communication assembly 202 of the second vehicle to the communication assembly 202 of the first vehicle. Upon receipt of the reply message, the first and second vehicles may be communicatively linked. The first vehicle may then remotely control operations of the second vehicle (or the second vehicle may remotely control operations of the first vehicle). Prior to communicatively linking the vehicles, one vehicle may not be capable of or permitted to remotely control operations of another vehicle.

Responsive to and/or after communicatively linking the vehicles 104, 106 in the vehicle system 102, the lead vehicle 104 can wirelessly communicate command messages to the remote vehicles 106. As described herein, these command messages can direct throttle positions, brake settings, speeds, or the like, to be used by the remote vehicles 106. The command messages may be received by control units 216 of the remote vehicles 106. The control units 216 can convey the command messages or generate other messages for communication to the propulsion system 220 and/or a braking system 224 of the vehicle 200. For example, if a command message directs a change in a throttle position, pedal position, speed, or the like, then the control unit 216 can generate and communicate an instruction message to the propulsion system 220 to cause the engine, motors, or the like, of the propulsion system 220 to change the throttle position, pedal position, speed, or the like. As another example, if the command message directs a change in braking effort of the vehicle 200, then the control unit 216 can generate and communicate an instruction message to the braking system 224. The braking system 224 can represent air brakes, friction brakes, dynamic brakes (e.g., traction motors), or the like, that generate braking effort to slow or stop movement of the vehicle 200. In response to receiving the instruction message, the braking system 224 can generate the instructed braking effort.

During travel of the vehicle system 102 along the route 110, one or more communication devices 204 of the vehicle 200 may fail (referred to herein as a communication fault). For example, the communication device 204A being used to wirelessly send and/or receive messages may no longer be able to send and/or receive messages. The control unit 216 may determine when the communication device 204A fails and, in response thereto, switch to using the communication device 204B to wirelessly send and/or receive messages with other vehicles in the vehicle system 102.

The vehicles 104, 106 in the vehicle system 102 may self-test the communication assemblies 202 disposed onboard the vehicles 104, 106 by communicating the onboard messages between the communication devices 204 of the communication assemblies 202 being tested to determine the operative states of the communication devices 204. Optionally, one or more of the communication assemblies 202 may be tested or examined by communicating test messages with one or more other communication assemblies 202 disposed onboard another vehicle 104, 106.

Figure 3:
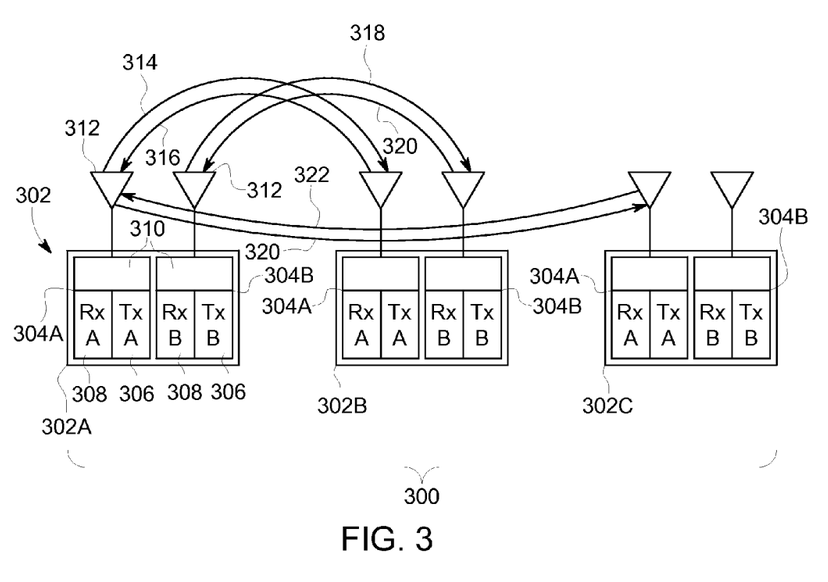
FIG. 3 illustrates a schematic diagram of the communication system shown in FIG. 1 according to one embodiment.

FIG. 3 illustrates a schematic diagram of the communication system 100 shown in FIG. 1 according to one embodiment. The communication system 100 shown in FIG. 3 includes three communication assemblies 302 (e.g., communication assemblies 302A-C), which each may be disposed onboard a different vehicle 104 and/or 106 of the vehicle system 102 shown in FIG. 1. Alternatively, the communication system 100 may include a fewer or larger number of the communication assemblies 302. Each of the communication assemblies 302 can represent the communication assembly 202 shown in FIG. 2. The communication assemblies 302 can include communication devices 304 (e.g., communication devices 304A, 304B), which may be similar or identical to the communication devices 204 shown in FIG. 2. The communication devices 304 can include transmitters 306 (which may be similar or identical to the transmitters 206 shown in FIG. 2), receivers 308 (which may be similar or identical to the receivers 208 shown in FIG. 2), circuitry 310 (which may be similar or identical to the circuitry 210 shown in FIG. 2), and antennas 312 (which may be similar or identical to the antennas 212 shown in FIG. 2). In one embodiment, the communication devices 304A of the communication assemblies 302 may be the primary communication devices and the communication devices 304B may be the backup or redundant communication devices of the communication assemblies 302. Alternatively, the communication devices 304B of the communication assemblies 302 may be the primary communication devices and the communication devices 304A may be the backup or redundant communication devices of the communication assemblies 302. Alternatively, In order to test communication between the communication assemblies 302 of different vehicles 104, 106, different communication devices 304 of different communication assemblies 302 can communicate off-board messages with each other. For example, in the examination of the communication assemblies 302A, 302B, the transmitter 306 of the communication device 304A in the communication assembly 302A of a first vehicle 104, 106 can wirelessly transmit and/or broadcast a first off-board message 314 to the receiver 308 of the communication device 304A in the communication assembly 302B onboard a different, second vehicle 104, 106. The transmitter 306 of the communication device 304A in the communication assembly 302B of the second vehicle 104, 106 may wirelessly transmit and/or receive a second off-board message 316 to the receiver 308 of the communication device 304A in the communication assembly 302A. In order to test the other communication devices 304B of these communication assemblies 302A, 302B, the transmitter 306 of the communication device 304B in the communication assembly 302A of the first vehicle 104, 106 can wirelessly transmit and/or broadcast a third off-board message 318 to the receiver 308 of the communication device 304B in the communication assembly 302B onboard the second vehicle 104, 106. The transmitter 306 of the communication device 304B in the communication assembly 302B of the second vehicle 104, 106 may wirelessly transmit and/or receive a fourth off-board message 320 to the receiver 308 of the communication device 304B in the communication assembly 302A. As described above in connection with the onboard messages, the content of the off-board messages may be examined to determine if the off-board messages were successfully received. Successful receipt of the content of the off-board messages can indicate that a corresponding communication device 304 has an operative state that indicates that the communication device 304 is operating and able to wirelessly communicate messages.

This process may be repeated for other vehicles 104, 106. For example, the communication assembly 302A may represent the communication assembly 202 of the lead vehicle 104 and the other communication assemblies 302 may represent the communication assemblies 302 disposed onboard other remote vehicles 106 in the vehicle system 102. The transmitter 306 of the communication device 304A in the communication assembly 302A onboard the lead vehicle 104 may communicate a fifth off-board message 320 to the receiver 308 of the communication device 304A in the communication assembly 302C onboard a third vehicle (e.g., another remote vehicle 106) and the transmitter 306 of the communication device 304A in the communication assembly 302C onboard the third vehicle 106 may communicate a sixth off-board message 322 to the receiver 308 of the communication device 304A in the communication assembly 302A onboard the lead vehicle 104. Similarly, the transmitter 306 of the communication device 304B in the communication assembly 302A onboard the lead vehicle 104 may communicate a seventh off-board message to the receiver 308 of the communication device 304B in the communication assembly 302C onboard the third vehicle 106 and the transmitter 306 of the communication device 304B in the communication assembly 302C onboard the third vehicle 106 may communicate an eighth off-board message to the receiver 308 of the communication device 304B in the communication assembly 302A onboard the lead vehicle 104.

As described above in connection with the onboard messages, the communication assemblies 302 can examine the received off-board messages to determine if the off-board messages were successfully received. Depending on which off-board messages are received, operational states of the communication assemblies 302 can be determined, as described above in connection with the onboard messages.

Optionally, one or more of the communication assemblies 302 may be disposed off-board the vehicle system 102. For example, the communication assembly 302C may be disposed in a tower communication system or other tower that wirelessly communicates with the vehicle system 102. The communication assembly 302C of the tower may communicate with the communication assemblies 202, 302 disposed onboard the vehicle system 102 to remotely control the vehicle system 102 and/or to communicate other information with the vehicle system 102. As another example, one or more of the communication assemblies 302 may be disposed in a stationary device, such as a wayside message repeater device. Such a device can receive a wireless message sent by one vehicle 104, 106 in the vehicle system 102 and repeat the message by wirelessly re-transmitting and/or re-broadcasting the message to one or more other vehicles 104, 106 of the vehicle system 102. Such a repeater device may be used to ensure that wireless communications between vehicles 104, 106 in longer vehicle systems 102, in vehicle systems 102 traveling through tunnels, etc., continue uninterrupted.

Figure 4:
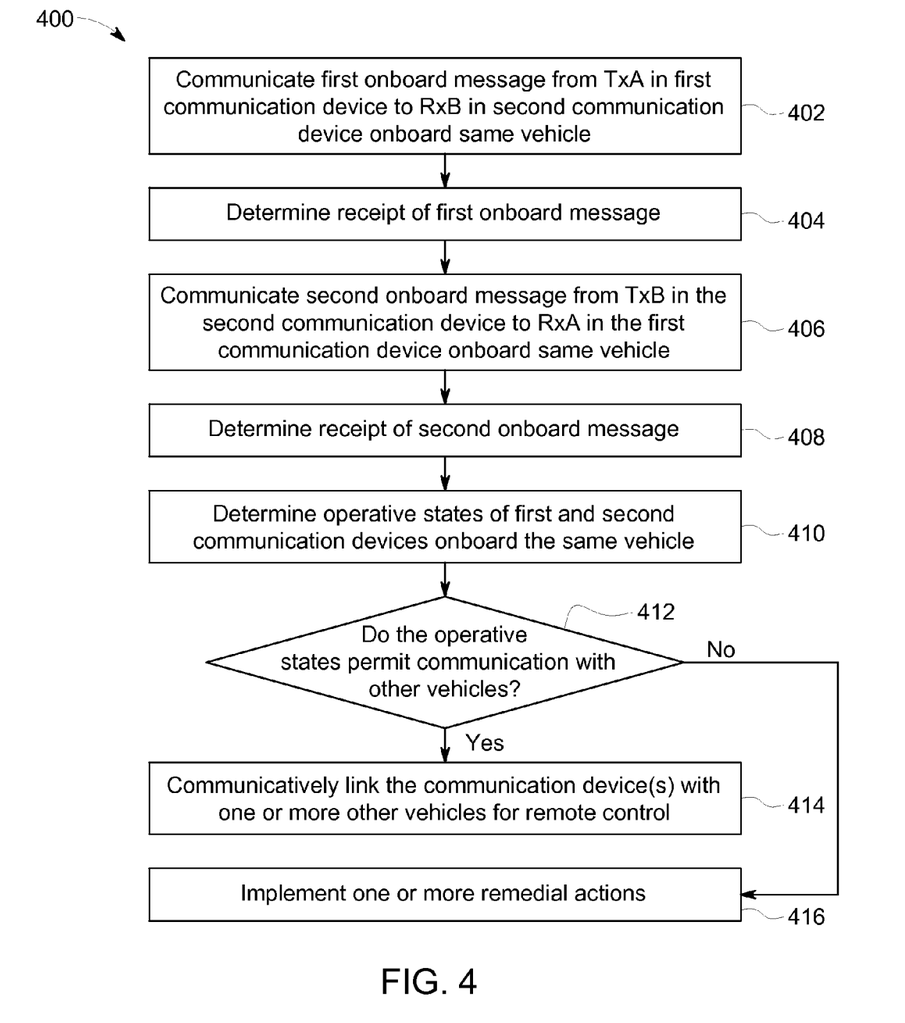
FIG. 4 illustrates a flowchart of a method for testing communication in a vehicle system according to one embodiment.

FIG. 4 illustrates a flowchart of a method 400 for testing communication in a vehicle system according to one embodiment. The method 400 may be used to determine operational states of communication devices disposed onboard one or more vehicles 104, 106 of the vehicle system 102 shown in FIG. 1. In one aspect, the method 400 may be used to test the operation of the communication assembly 202 (shown in FIG. 2) of a vehicle 104, 106.

At 402, an onboard message is communicated from a transmitter of one communication device onboard a vehicle to a receiver of another communication device onboard the same vehicle. For example, the transmitter 206A of the communication device 204A may wirelessly transmit and/or broadcast a first onboard message to the receiver 208B of the communication device 204B in the same communication assembly 202 shown in FIG. 2.

At 404, a determination is made as to whether the onboard message was successfully received. For example, the communication assembly 202 can examine the content of the onboard message received by the receiver 208B of the communication device 204B to determine if the content of the onboard message was received. Optionally, the communication assembly 202 can determine if the onboard message was received subsequent to the transmitter 206 sending the onboard message. For example, after the onboard message is sent, the communication assembly 202 may begin determining if any message is received to determine if the onboard message is received.

At 406, another onboard message is communicated from another transmitter of a communication device to another receiver of another communication device onboard the vehicle. For example, the transmitter 206 of the communication device 204B may wirelessly transmit and/or broadcast a second onboard message to the receiver 208 of the communication device 204A in the same communication assembly 202.

At 408, a determination is made as to whether the onboard message was successfully received. For example, the communication assembly 202 can examine the content of the onboard message received by the receiver 208 of the communication device 204A to determine if the content of the onboard message was received. Optionally, the communication assembly 202 can determine if the onboard message was received subsequent to the transmitter 206 sending the onboard message. For example, after the onboard message is sent, the communication assembly 202 may begin determining if any message is received to determine if the onboard message is received.

At 410, operative states of the communication devices are determined. For example, if the first onboard message was received by the communication device 204A and the second onboard message was received by the communication device 204B, then both communication devices 204A, 204B may be determined to be operational and ready for wireless communication. As another example, if the first onboard message was received by the communication device 204A but the second onboard message was not received by the communication device 204B, then the communication device 204A may be determined to be operational and ready for wireless communication but the communication device 204B may be determined to not be operational and/or experiencing a communication fault. As another example, if the first onboard message was not received by the communication device 204A and the second onboard message was not received by the communication device 204B, then both the communication devices 204A, 204B may be determined to not be operational and/or experiencing a communication fault.

At 412, a determination is made as to whether the operational states that were determined permit communication with other vehicles in the vehicle system. For example, a determination may be made as to whether at least two or more communication devices 204 onboard the vehicle are operational. If only one or none of the communication devices 204 onboard the vehicle is operational, then the vehicle may not be capable of communication with other vehicles. As a result, flow of the method 400 can proceed to 416. If at least two of the communication devices 204 onboard the vehicle are operational, then the vehicle may be capable of communication with other vehicles. As a result, flow of the method 400 can proceed to 414.

In another embodiment, a determination may be made as to whether at least one of the communication devices 204 onboard the vehicle is operational. If none of the communication devices 204 onboard the vehicle is operational, then the vehicle may not be capable of communication with other vehicles. As a result, flow of the method 400 can proceed to 416. If at least one of the communication devices 204 onboard the vehicle is operational, then the vehicle may be capable of communication with other vehicles. As a result, flow of the method 400 can proceed to 414.

At 414, the vehicle is communicatively linked with one or more other vehicles. For example, the communication devices 204A, 204B may be disposed onboard a remote vehicle 106. Responsive to determining that the vehicle 106 may wirelessly communicate with another vehicle 104, the communication devices 204A and/or 204B may be communicatively linked with the lead vehicle 104. Subsequent to this communicative linking, the vehicle 106 may be remotely controlled by another vehicle 104 via command messages received by the communication device 204A and/or 204B, and/or reply messages communicated by the communication device 204A and/or 204B.

At 416, one or more remedial actions are taken. For example, if one or more of the communication devices 204 are not operational, then the control unit 216 (shown in FIG. 2) can present instructions on the output device 228 (shown in FIG. 2) to guide an operator how to fix and/or inspect the communication devices 204. These instructions can provide further messages to be communicated, for the operator to check the state of the switches 222 (shown in FIG. 2), or the like.

Figure 5A:
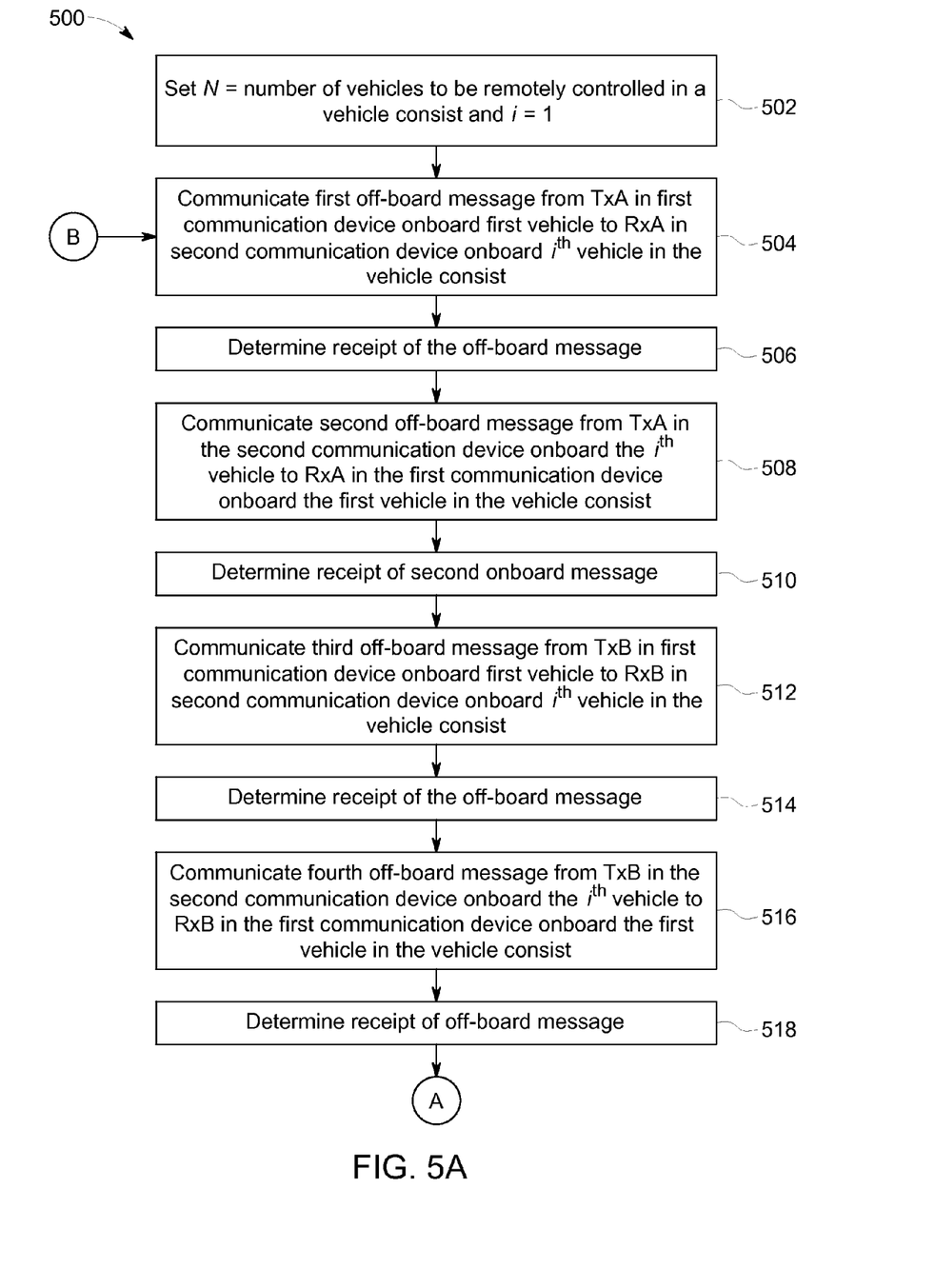
FIGS. 5A and 5B illustrate a flowchart of a method for testing communication in a vehicle system according to another embodiment.
Figure 5B:
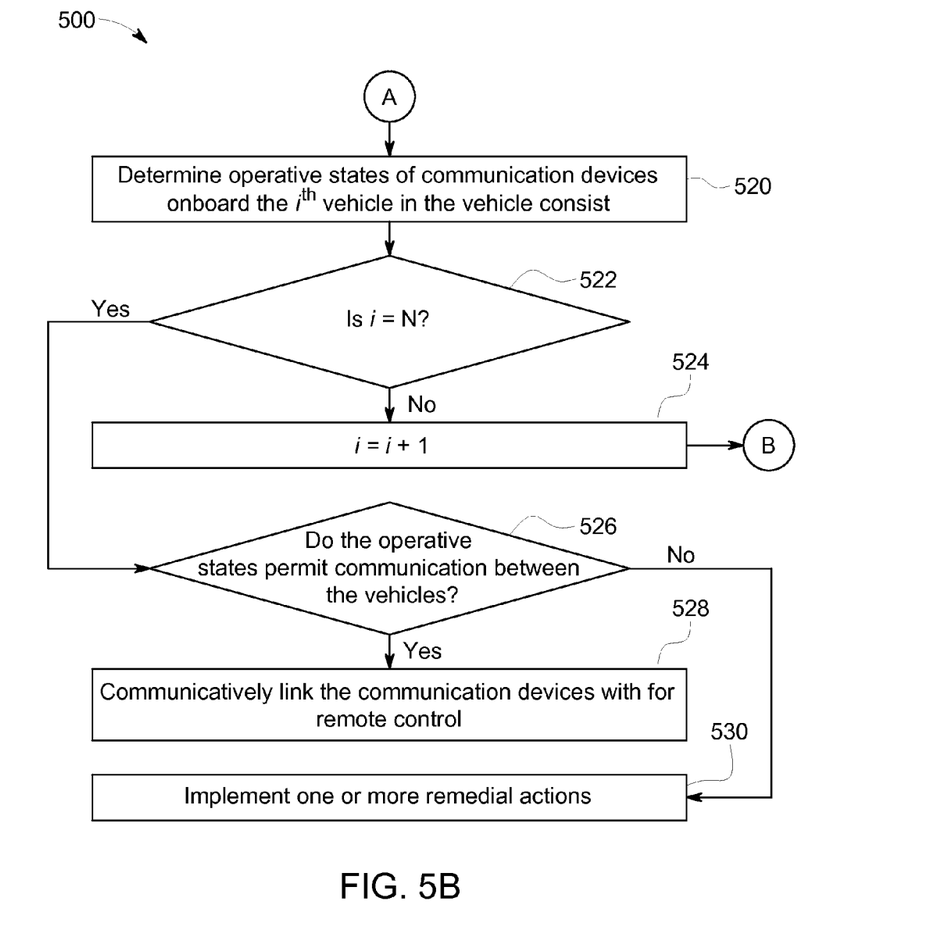

FIGS. 5A and 5B illustrate a flowchart of a method 500 for testing communication in a vehicle system according to another embodiment. The method 500 may be used to determine operational states of the communication devices disposed onboard two or more vehicles 104, 106 of the vehicle system 102 shown in FIG. 1. In one aspect, the method 500 may be used to test the operation of communication assemblies 202 (shown in FIG. 2) of two or more vehicles 104, 106 to determine if the vehicles 104, 106 can communicate with each other.

At 502, values of parameters representative of how many remote vehicles 106 are included in the vehicle system 106 (e.g., N) and which remote vehicle 106 is being examined (e.g., i) are set. For example, if a vehicle system 106 includes the lead vehicle 104 and four remote vehicles 106, then the value of N can be set to four and the value of i can be set to one.

At 504, an off-board message is communicated from a transmitter of a first communication device onboard a first vehicle to a receiver of a first communication device onboard the $i^{th}$ vehicle. For example, the transmitter 206 of the communication device 204A onboard the vehicle 104 may wirelessly transmit and/or broadcast a first off-board message to the receiver 208 of the communication device 204A in the vehicle 106A shown in FIG. 1.

At 506, a determination is made as to whether the off-board message was successfully received. For example, the communication assembly 202 onboard the $i^{th}$ vehicle 106 can examine the content of the off-board message received by the receiver 208 of the communication device 204A to determine if the content of the off-board message was received.

At 508, another off-board message is communicated from a transmitter of the first communication device onboard the $i^{th}$ vehicle to a receiver of the first communication device onboard the lead vehicle 104. For example, the transmitter 206 of the communication device 204A onboard the remote vehicle 106A may wirelessly transmit and/or broadcast a second off-board message to the receiver 208 of the communication device 204A in the lead vehicle 104.

At 510, a determination is made as to whether the off-board message was successfully received. For example, the communication assembly 202 onboard the lead vehicle 104 can examine the content of the off-board message received by the receiver 208 of the communication device 204A in the lead vehicle 104 to determine if the content of the off-board message was received.

At 512, an off-board message is communicated from a transmitter of a second communication device onboard the first vehicle to a receiver of a second communication device onboard the $i^{th}$ vehicle. For example, the transmitter 206 of the communication device 204B onboard the lead vehicle 104 may wirelessly transmit and/or broadcast a third off-board message to the receiver 208 of the communication device 204B in the vehicle 106A shown in FIG. 1.

At 514, a determination is made as to whether the off-board message was successfully received. For example, the communication assembly 202 onboard the $i^{th}$ vehicle 106 can examine the content of the off-board message received by the receiver 208 of the communication device 204B to determine if the content of the off-board message was received.

At 516, another off-board message is communicated from a transmitter of the second communication device onboard the $i^{th}$ vehicle to a receiver of the second communication device onboard the lead vehicle 104. For example, the transmitter 206 of the communication device 204B onboard the remote vehicle 106A may wirelessly transmit and/or broadcast a second off-board message to the receiver 208 of the communication device 204B in the lead vehicle 104.

At 518, a determination is made as to whether the off-board message was successfully received. For example, the communication assembly 202 onboard the lead vehicle 104 can examine the content of the off-board message received by the receiver 208 of the communication device 204B in the lead vehicle 104 to determine if the content of the off-board message was received.

At 520, operative states of the communication devices of the $i^{th}$ vehicle are determined. For example, if the first off-board message is received by the receiver 208 of the first communication device 204A onboard the remote vehicle 106A, the second off-board message is received by the receiver 208 of the first communication device 204A onboard the lead vehicle 104, the third off-board message is received by the receiver 208 of the second communication device 204B onboard the remote vehicle 106A, and/or the fourth off-board message is received by the receiver 208 of the second communication device 204B onboard the lead vehicle 104, then the communication devices onboard the $i^{th}$ vehicle (e.g., the remote vehicle 106A) may be identified as being operational. But, if one or more of the off-board messages are not received, then one or more of the communication devices onboard the $i^{th}$ vehicle (e.g., the remote vehicle 106A) may be identified as not being operational. For example, if the first off-board message is not received by the receiver 208 of the first communication device 204A onboard the remote vehicle 106A and/or the second off-board message is not received by the receiver 208 of the first communication device 204A onboard the lead vehicle 104, then the first communication device 204A of the remote vehicle 106A may be identified as being non-operational (e.g., experiencing a communication fault). As another example, if the third off-board message is not received by the receiver 208 of the second communication device 204B onboard the remote vehicle 106A and/or the fourth off-board message is not received by the receiver 208 of the second communication device 204B onboard the lead vehicle 104, then the second communication device 204B of the remote vehicle 106A may be identified as being non-operational.

At 522, a determination is made as to whether communication with the remote vehicles in the vehicle system has completed. For example, a determination may be made as to whether the current value of i is equal to the total number of remote vehicles (N). If i=N, then communication with each of the remote vehicles may be complete, and flow of the method 500 can proceed to 526. But, if the value of i is less than N, then communication with one or more additional remote vehicles may need to be tested. As a result, flow of the method 500 can proceed to 524, where the value of i is increased. Flow of the method 500 can return to 504 so that communication with the next remote vehicle can be examined.

At 524, a determination is made as to whether the operational states of one or more, or all, of the remote vehicles indicate an ability for the remote vehicles to communicate with the lead vehicle in the vehicle system. For example, a determination may be made as to whether at least two or more communication devices 204 onboard one or more of the remote vehicles are operational. If only one or none of the communication devices 204 onboard one or more of the remote vehicles is operational, then that remote vehicle may not be capable of communication with the lead vehicle. As a result, flow of the method 500 can proceed to 530. If at least two of the communication devices 204 onboard one or more of the vehicles are operational, then those remote vehicles may be capable of communication with the lead vehicle. As a result, flow of the method 500 can proceed to 528.

In another embodiment, a determination may be made as to whether at least one of the communication devices 204 onboard one or more of the remote vehicles is operational. If none of the communication devices 204 onboard a remote vehicle is operational, then that remote vehicle may not be capable of communication with the lead vehicle. As a result, flow of the method 500 can proceed to 530. If at least one of the communication devices 204 onboard one or more of the remote vehicles is operational, then that remote vehicle may be capable of communication with the lead vehicle. As a result, flow of the method 500 can proceed to 528.

At 528, the remote vehicles are communicatively linked with the lead vehicle. For example, responsive to determining that the remote vehicles may wirelessly communicate with the lead vehicle 104, the communication devices 204A and/or 204B of the remote vehicles 106 may be communicatively linked with the lead vehicle 104. Subsequent to this communicative linking, the remote vehicles 106 may be remotely controlled by the lead vehicle 104 via command messages received by the communication devices 204A and/or 204B onboard the remote vehicles 106, and/or reply messages communicated by the communication devices 204A and/or 204B of the remote vehicles 106.

At 528, one or more remedial actions are taken. For example, if one or more of the communication devices 204 are not operational, then the control unit 216 (shown in FIG. 2) can present instructions on the output device 228 (shown in FIG. 2) to guide an operator how to fix and/or inspect the communication devices 204. These instructions can provide further messages to be communicated, for the operator to check the state of the switches 222 (shown in FIG. 2), or the like.

In one embodiment, a method (e.g., for testing communication in a vehicle system) includes wirelessly communicating a first onboard message from a first communication device onboard a first vehicle to a second communication device that also is onboard the first vehicle. The first communication device and the second communication device are configured to wirelessly communicate with one or more other communication devices disposed onboard one or more second vehicles in a vehicle system that includes the first vehicle and the one or more second vehicles for remote control of at least one of the first vehicle or the one or more second vehicles. The method also can include determining receipt of the first onboard message at the second communication device, wirelessly communicating a second onboard message from the second communication device to the first communication device, determining receipt of the second onboard message at the first communication device, and determining a first operative state of the first communication device and a second operative state of the second communication device of the first vehicle based at least in part on the receipt of the first onboard message at the second communication device and the receipt of the second onboard message at the first communication device.

In one aspect, determining the first operative state and the second operative state includes examining content of the first onboard message and examining content of the second onboard message.

In one aspect, the method also can include communicatively linking the first vehicle with the one or more second vehicles responsive to determining the first operative state of the first communication device and the second operative state of the second communication device.

In one aspect, the method also can include one or more of wirelessly sending and/or wirelessly receiving a command message with one or more of the first communication device or the second communication device to remotely control movement of the first vehicle or the one or more second vehicles responsive to the first vehicle being communicatively linked with the one or more second vehicles.

In one aspect, the one or more of wirelessly sending and/or wirelessly receiving the command message is performed by the first communication device. The method also can include switching to one or more of wirelessly sending and/or wirelessly receiving the command message with the second communication device responsive to the first operative state of the first communication device indicating a communication fault.

In one aspect, the method also can include wirelessly communicating a first off-board message from the first communication device to one or more third communication devices disposed onboard the one or more second vehicles, determining receipt of the first off-board message at the one or more third communication devices, wirelessly receiving a second off-board message at the second communication device from the one or more third communication devices, determining receipt of the second off-board message at the second communication device, and determining one or more third operative states of the one or more third communication devices based at least in part on the receipt of the first off-board message at the one or more third communication devices and the receipt of the second off-board message at the second communication device.

In one aspect, wirelessly communicating the first off-board message includes one or more of transmitting or broadcasting the first off-board message from the first communication device to one or more of a wayside message repeater device or a tower communication system.

In one aspect, wirelessly receiving the second off-board message includes receiving the second off-board message from one or more of a wayside message repeater device or a tower communication system.

In one aspect, the first operative state of the first communication device indicates an ability of the first communication device to wirelessly communicate with the one or more other communication devices and the second operative state of the second communication device indicates an ability of the second communication device to wirelessly communicate with the one or more other communication devices.

In one aspect, the first operative state of the first communication device and the second operative state of the second communication device indicate closure of a switch conductively coupled with the first communication device and the second communication device.

In another embodiment, a system (e.g., a communication system of a vehicle system) includes first and second communication devices, and one or more processors. The first communication device is configured to be disposed onboard a first vehicle in a vehicle system that also includes one or more second vehicles. The second communication device is configured to also be disposed onboard the first vehicle. The one or more processors are configured to be disposed onboard the first vehicle. The first communication device and the second communication device are configured to wirelessly communicate with one or more other communication devices disposed onboard the one or more second vehicles for remote control of at least one of the first vehicle or the one or more second vehicles. The first communication device is configured to wirelessly communicate a first onboard message to the second communication device and the second communication device is configured to wirelessly communicate a second onboard message from the second communication device to the first communication device. The one or more processors are configured to determine receipt of the first onboard message at the second communication device and receipt of the second onboard message at the first communication device. The one or more processors also are configured to determine a first operative state of the first communication device and a second operative state of the second communication device of the first vehicle based at least in part on the receipt of the first onboard message at the second communication device and the receipt of the second onboard message at the first communication device.

In one aspect, the one or more processors can be configured to determine the first operative state and the second operative state by examining content of the first onboard message and examining content of the second onboard message.

In one aspect, the one or more processors can be configured to communicatively link the first vehicle with the one or more second vehicles responsive to determining the first operative state of the first communication device and the second operative state of the second communication device.

In one aspect, one or more of the first communication device and/or the second communication device is configured to one or more of wirelessly send or wirelessly receive a command message to remotely control movement of the first vehicle or the one or more second vehicles responsive to the first vehicle being communicatively linked with the one or more second vehicles.

In one aspect, the first communication device can be configured to one or more of wirelessly send or wirelessly receive the command message. The one or more processors can be configured to switch to one or more of wirelessly send or wirelessly receive the command message with the second communication device responsive to the first operative state of the first communication device indicating a communication fault.

In one aspect, the first communication device also is configured to wirelessly communicate a first off-board message to one or more third communication devices disposed onboard the one or more second vehicles and the second communication device also is configured to wirelessly receive a second off-board message at the second communication device from the one or more third communication devices. The one or more processors can be configured to determine receipt of the first off-board message at the one or more third communication devices and receipt of the second off-board message at the second communication device. The one or more processors also may be configured to determine one or more third operative states of the one or more third communication devices based at least in part on the receipt of the first off-board message at the one or more third communication devices and the receipt of the second off-board message at the second communication device.

In one aspect, the first communication device can be configured to wirelessly communicate the first off-board message by one or more of transmitting or broadcasting the first off-board message to one or more of a wayside message repeater device or a tower communication system.

In one aspect, the second communication device can be configured to wirelessly receive the second off-board message from one or more of a wayside message repeater device or a tower communication system.

In one aspect, the first operative state of the first communication device indicates an ability of the first communication device to wirelessly communicate with the one or more other communication devices and the second operative state of the second communication device indicates an ability of the second communication device to wirelessly communicate with the one or more other communication devices.

In one aspect, the first operative state of the first communication device and the second operative state of the second communication device indicate closure of a switch conductively coupled with the first communication device and the second communication device.

In another embodiment, another system (e.g., another communication system) includes first and second transceiver devices, and one or more processors. The first transceiver device can be configured to be disposed onboard a first vehicle in a vehicle system that also includes one or more second vehicles. The first transceiver device includes a first transmitter and a first receiver. The second transceiver device can be configured to also be disposed onboard the first vehicle. The second transceiver device includes a second transmitter and a second receiver. The first transmitter is configured to wirelessly transmit a first onboard message to the second receiver and the second transmitter is configured to wirelessly transmit a second onboard message to the first receiver. The one or more processors can be configured to be disposed onboard the first vehicle and to determine operative states of the first transceiver device and the second transceiver device based on receipt of the first onboard message at the second receiver and receipt of the second onboard message at the first receiver. Responsive to determining that the first onboard message and the second onboard message were received, the one or more processors are configured to communicatively link one or more of the first transceiver device or the second transceiver device with one or more third transceiver devices disposed onboard the one or more second vehicles.

In one aspect, the first transmitter also is configured to wirelessly transmit a first off-board message to the one or more third transceiver devices and the second receiver also is configured to wirelessly receive a second off-board message from the one or more third communication devices. The one or more processors can be configured to determine one or more third operative states of the one or more third transceiver devices based at least in part on receipt of the first off-board message at the one or more third communication devices and receipt of the second off-board message at the second receiver.

In another embodiment, a system (e.g., another communication system) includes one or more processors configured to be disposed onboard a first vehicle in a vehicle system that also includes one or more second vehicles. The one or more processors are further configured to determine receipt of a first onboard message from a first communication device onboard the first vehicle at a second communication device onboard the first vehicle and receipt of a second onboard message from the second communication device at the first communication device. The first communication device and the second communication device can be configured to wirelessly communicate with one or more other communication devices disposed onboard the one or more second vehicles for remote control of at least one of the first vehicle or the one or more second vehicles. The one or more processors can be configured to determine a first operative state of the first communication device and a second operative state of the second communication device of the first vehicle based at least in part on the receipt of the first onboard message at the second communication device and the receipt of the second onboard message at the first communication device.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose message processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A method comprising:
wirelessly communicating a first onboard message from a first communication device onboard a first vehicle to a second communication device that also is onboard the first vehicle, the first communication device and the second communication device configured to wirelessly communicate with one or more other communication devices disposed onboard one or more second vehicles in a vehicle system that includes the first vehicle and the one or more second vehicles for remote control of at least one of the first vehicle or the one or more second vehicles;
determining receipt of the first onboard message at the second communication device;
wirelessly communicating a second onboard message from the second communication device to the first communication device;
determining receipt of the second onboard message at the first communication device; and
determining a first operative state of the first communication device and a second operative state of the second communication device of the first vehicle based at least in part on the receipt of the first onboard message at the second communication device and the receipt of the second onboard message at the first communication device,
wherein the first operative state of the first communication device and the second operative state of the second communication device indicate closure of a switch conductively coupled with the first communication device and the second communication device, or indicate opening of the switch conductively decoupled with the first communication device and the second communication device;
wherein the closure of the switch corresponds to an occurrence of a communication fault and the opening of the switch corresponds to a non-occurrence of the communication fault.

2. The method of claim 1, wherein determining the first operative state and the second operative state includes examining content of the first onboard message and examining content of the second onboard message.

3. The method of claim 1, further comprising communicatively linking the first vehicle with the one or more second vehicles responsive to determining the first operative state of the first communication device and the second operative state of the second communication device.

4. The method of claim 3, further comprising one or more of wirelessly sending or wirelessly receiving a command message with one or more of the first communication device or the second communication device to remotely control movement of the first vehicle or the one or more second vehicles responsive to the first vehicle being communicatively linked with the one or more second vehicles.

5. The method of claim 4, wherein the one or more of wirelessly sending or wirelessly receiving the command message is performed by the first communication device, and further comprising switching to one or more of wirelessly sending or wirelessly receiving the command message with the second communication device responsive to the first operative state of the first communication device indicating the communication fault.

6. The method of claim 1, further comprising:
wirelessly communicating a first off-board message from the first communication device to one or more third communication devices disposed onboard the one or more second vehicles;
determining receipt of the first off-board message at the one or more third communication devices;
wirelessly receiving a second off-board message at the second communication device from the one or more third communication devices;
determining receipt of the second off-board message at the second communication device; and
determining one or more third operative states of the one or more third communication devices based at least in part on the receipt of the first off-board message at the one or more third communication devices and the receipt of the second off-board message at the second communication device.

7. The method of claim 6, wherein wirelessly communicating the first off-board message includes one or more of transmitting or broadcasting the first off-board message from the first communication device to one or more of a wayside message repeater device or a tower communication system that is off-board the vehicle system.

8. The method of claim 7, wherein wirelessly receiving the second off-board message includes receiving the second off-board message from one or more of the wayside message repeater device or the tower communication system that is off-board the vehicle system.

9. The method of claim 1, wherein the first operative state of the first communication device indicates an ability of the first communication device to wirelessly communicate with the one or more other communication devices and the second operative state of the second communication device indicates an ability of the second communication device to wirelessly communicate with the one or more other communication devices.

10. A system comprising:
a first communication device configured to be disposed onboard a first vehicle in a vehicle system that also includes one or more second vehicles;
a second communication device configured to also be disposed onboard the first vehicle; and
one or more processors configured to be disposed onboard the first vehicle, wherein the first communication device and the second communication device are configured to wirelessly communicate with one or more other communication devices disposed onboard the one or more second vehicles for remote control of at least one of the first vehicle or the one or more second vehicles,
wherein the first communication device is configured to wirelessly communicate a first onboard message to the second communication device and the second communication device is configured to wirelessly communicate a second onboard message to the first communication device,
wherein the one or more processors are configured to determine receipt of the first onboard message at the second communication device and receipt of the second onboard message at the first communication device, and
wherein the one or more processors are configured to determine a first operative state of the first communication device and a second operative state of the second communication device of the first vehicle based at least in part on the receipt of the first onboard message at the second communication device and the receipt of the second onboard message at the first communication device, wherein the first operative state of the first communication device and the second operative state of the second communication device indicate closure of a switch conductively coupled with the first communication device and the second communication device, or indicate opening of the switch conductively decoupled with the first communication device and the second communication device, wherein closure of the switch corresponds to an occurrence of a communication fault and the opening of the switch corresponds to a non-occurrence of the communication fault.

11. The system of claim 10, wherein the one or more processors are configured to determine the first operative state and the second operative state by examining content of the first onboard message and examining content of the second onboard message.

12. The system of claim 10, wherein the one or more processors are configured to communicatively link the first vehicle with the one or more second vehicles responsive to determining the first operative state of the first communication device and the second operative state of the second communication device.

13. The system of claim 10, wherein the first communication device also is configured to wirelessly communicate a first off-board message to one or more third communication devices disposed onboard the one or more second vehicles and the second communication device also is configured to wirelessly receive a second off-board message at the second communication device from the one or more third communication devices, wherein the one or more processors are configured to determine receipt of the first off-board message at the one or more third communication devices and receipt of the second off-board message at the second communication device, and wherein the one or more processors are configured to determine one or more third operative states of the one or more third communication devices based at least in part on the receipt of the first off-board message at the one or more third communication devices and the receipt of the second off-board message at the second communication device.

14. The system of claim 13, wherein the first communication device is configured to wirelessly communicate the first off-board message by one or more of transmitting or broadcasting the first off-board message to one or more of a wayside message repeater device or a tower communication system that is off-board the vehicle system.

15. The system of claim 14, wherein the second communication device is configured to wirelessly receive the second off-board message from one or more of the wayside message repeater device or the tower communication system that is off-board the vehicle system.

16. The system of claim 10, wherein the first operative state of the first communication device indicates an ability of the first communication device to wirelessly communicate with the one or more other communication devices and the second operative state of the second communication device indicates an ability of the second communication device to wirelessly communicate with the one or more other communication devices.

17. A system comprising:

a first transceiver device configured to be disposed onboard a first vehicle in a vehicle system that also includes one or more second vehicles, the first transceiver device including a first transmitter and a first receiver;

a second transceiver device configured to also be disposed onboard the first vehicle, the second transceiver device including a second transmitter and a second receiver, wherein the first transmitter is configured to wirelessly transmit a first onboard message to the second receiver and the second transmitter is configured to wirelessly transmit a second onboard message to the first receiver; and one or more processors configured to be disposed onboard the first vehicle and to determine operative states of the first transceiver device and the second transceiver device based on receipt of the first onboard message at the second receiver and receipt of the second onboard message at the first receiver, and wherein, responsive to determining that the first onboard message and the second onboard message were received, the one or more processors are configured to communicatively link one or more of the first transceiver device or the second transceiver device with one or more third transceiver devices disposed onboard the one or more second vehicles, wherein the operative states of the first transceiver device and the second operative state of the second transceiver device indicate closure of a switch conductively coupled with the first transceiver device and the second transceiver device, or indicate opening of the switch conductively decoupled with the first transceiver device and the second transceiver device, wherein closure of the switch corresponds to an occurrence of a communication fault and opening of the switch corresponds to a non-occurrence of the communication fault.

18. The system of claim 17, wherein the first transmitter also is configured to wirelessly transmit a first off-board message to the one or more third transceiver devices and the second receiver also is configured to wirelessly receive a second off-board message from the one or more third communication devices, and wherein the one or more processors are configured to determine one or more third operative states of the one or more third transceiver devices based at least in part on receipt of the first off-board message at the one or more third communication devices and receipt of the second off-board message at the second receiver.

19. A system comprising:

one or more processors configured to be disposed onboard a first vehicle in a vehicle system that also includes one or more second vehicles;

wherein the one or more processors are further configured to determine receipt of a first onboard message from a first communication device onboard the first vehicle at a second communication device onboard the first vehicle and receipt of a second onboard message from the second communication device at the first communication device, the first communication device and the second communication device configured to wirelessly communicate with one or more other communication devices disposed onboard the one or more second vehicles for remote control of at least one of the first vehicle or the one or more second vehicles, and wherein the one or more processors are configured to determine a first operative state of the first communication device and a second operative state of the second communication device of the first vehicle based at least in part on the receipt of the first onboard message at the second communication device and the receipt of the second onboard message at the first communication device, wherein the first operative state of the first communication device and the second operative state of the second communication device indicate closure of a switch conductively coupled with the first communication device and the second communication device, or indicate opening of the switch conductively decoupled with the first communication device and the second communication device;

wherein closure of the switch corresponds to an occurrence of a communication fault and opening of the switch corresponds to a non-occurrence of the communication fault.

* * * * *